US011879342B2

(12) United States Patent
Gaillard et al.

(10) Patent No.: US 11,879,342 B2
(45) Date of Patent: Jan. 23, 2024

(54) TURBINE ASSEMBLY, AND GAS TURBINE ENGINE PROVIDED WITH SUCH AN ASSEMBLY

(71) Applicant: Safran Aircraft Engines, Paris (FR)

(72) Inventors: Aurélien Gaillard, Moissy-cramayel (FR); Clément Emile André Cazin, Moissy-cramayel (FR); Clément Jarrossay, Moissy-cramayel (FR); Pascal Cédric Tabarin, Moissy-cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/912,664

(22) PCT Filed: Mar. 19, 2021

(86) PCT No.: PCT/FR2021/050458
§ 371 (c)(1),
(2) Date: Sep. 19, 2022

(87) PCT Pub. No.: WO2021/186134
PCT Pub. Date: Sep. 23, 2021

(65) Prior Publication Data
US 2023/0142040 A1    May 11, 2023

(30) Foreign Application Priority Data

Mar. 20, 2020 (FR) ...................... 2002745

(51) Int. Cl.
*F01D 5/18* (2006.01)
*F01D 11/24* (2006.01)
(Continued)

(52) U.S. Cl.
CPC .............. *F01D 11/24* (2013.01); *F01D 5/186* (2013.01); *F01D 25/12* (2013.01); *F01D 25/24* (2013.01);
(Continued)

(58) Field of Classification Search
CPC .......... F01D 11/24; F01D 5/184; F01D 25/12; F01D 25/24; F05D 2220/32;
(Continued)

(56) References Cited

U.S. PATENT DOCUMENTS 5,964,575 A * 10/1999 Marey ..................... F01D 25/12
415/173.1
10,240,476 B2 * 3/2019 Varney .................. F01D 11/005
(Continued)

FOREIGN PATENT DOCUMENTS

EP        1176285 A2     1/2002
EP        1176285 A3     1/2004
(Continued)

OTHER PUBLICATIONS

International Search Report, issued in PCT/FR2021/050458, PCT/ISA/210, dated May 27, 2021.
(Continued)

*Primary Examiner* — Eric J Zamora Alvarez
*Assistant Examiner* — Theodore C Ribadeneyra
(74) *Attorney, Agent, or Firm* — BIRCH, STEWART, KOLASCH & BIRCH, LLP

(57) ABSTRACT

A turbine assembly (1) comprising: —a plurality of turbine ring sectors (20) made of ceramic-matrix composite material, —a ring support structure (3), comprising an annular shroud (6), and in addition —a plurality of angular spacer sectors (70) together forming an annular spacer (7), said annular spacer (7) being, on the one hand, fixed to the turbine ring (2) and, on the other hand, fixed to said annular
(Continued)

shroud (6), characterized in that said turbine assembly (1) comprises at least one air diffuser (8), which is configured to diffuse cooling air onto the radially outer face (212) of at least one of said turbine ring sectors (20), and in that said at least one air diffuser (8) is mounted by being nested on one of said angular spacer sectors (70), in a nested position.

8 Claims, 5 Drawing Sheets

(51) Int. Cl.
  *F01D 25/12* (2006.01)
  *F01D 25/24* (2006.01)

(52) U.S. Cl.
  CPC ...... *F05D 2220/32* (2013.01); *F05D 2240/14* (2013.01); *F05D 2240/30* (2013.01); *F05D 2240/55* (2013.01); *F05D 2260/202* (2013.01)

(58) Field of Classification Search
  CPC ............. F05D 2240/14; F05D 2240/30; F05D 2240/55; F05D 2260/202
  See application file for complete search history.

(56) References Cited

U.S. PATENT DOCUMENTS

| | | | |
|---|---|---|---|
| 10,900,378 B2* | 1/2021 | Smoke | F01D 25/12 |
| 2005/0129499 A1* | 6/2005 | Morris | F01D 9/04 |
| | | | 415/1 |
| 2005/0249584 A1 | 11/2005 | Amiot et al. | |
| 2012/0027572 A1 | 2/2012 | Denece et al. | |
| 2018/0087401 A1 | 3/2018 | Quennehen et al. | |
| 2018/0087405 A1 | 3/2018 | Quennehen et al. | |

FOREIGN PATENT DOCUMENTS

| | | |
|---|---|---|
| EP | 1593813 A1 | 11/2005 |
| EP | 3034803 A1 | 6/2016 |
| EP | 3118417 A1 | 1/2017 |
| FR | 3056637 A1 | 3/2018 |
| WO | WO 2015/108658 A1 | 7/2015 |
| WO | WO 2015/191169 A1 | 12/2015 |
| WO | WO 2015/191169 A8 | 12/2015 |

OTHER PUBLICATIONS

Search Report issued in FR priority application 2002745, dated Nov. 24, 2020.
Written Opinion of the International Searching Authority, issued in PCT/FR2021/050458, PCT/ISA/237, dated May 27, 2021.

* cited by examiner

TURBINE ASSEMBLY, AND GAS TURBINE ENGINE PROVIDED WITH SUCH AN ASSEMBLY

FIELD OF THE INVENTION

The invention relates to a turbine assembly comprising a plurality of ring sectors made of ceramic-matrix composite (CMC) material, assembled to form a turbine ring, and a ring support structure.

The field of application of the invention is in particular that of aeronautical gas turbine engines or turbomachines. The invention is however applicable to other turbomachines, for example industrial turbines.

STATE OF THE ART

In aeronautical gas turbine engines, the improvement of efficiency and the reduction of some polluting emissions lead to the search for an operation at ever higher temperatures. From the state of the art, an all-metal turbine ring assembly is already known. It is however necessary to cool all the elements of this assembly and particularly the turbine ring, because the latter is subjected to very hot streams whose temperature is higher than the temperature that the metal materials can withstand.

However, this cooling has a significant impact on the performance of the engine, because the cooling stream used is taken from the main stream of the engine. Furthermore, the use of metal for the turbine ring limits the possibilities of increasing the temperature at the turbine, which would nevertheless improve the performances of the aeronautical engines.

In an attempt to solve the aforementioned problem, it was envisaged to produce a turbine ring sector made of ceramic-matrix composite (CMC) material, in order to avoid the use of a metal material.

The ceramic-matrix composite materials are known to maintain their mechanical properties at temperatures significantly higher than metals, which makes them able to constitute elements of hot structure. The use of this type of materials allows reducing the cooling flow rate of the parts and therefore increasing the performance of the turbomachine. In addition, the CMC materials have the advantage of having a lower density than that of the metals usually used to produce a turbine ring. This allows envisaging a significant mass gain in the whole turbomachine.

The production of turbine ring sectors in a single piece of CMC material is in particular described in document US 2012/0027572. The ring sectors include an annular base whose inner face defines the inner face of the turbine ring and an outer face, from which two legs radially extend the ends of which are held between the two flanges of a metal ring support structure.

The use of CMC ring sectors thus allows significantly reducing the ventilation required to cool the turbine ring. However, the CMC having a different mechanical behavior from that of a metal material, its integration as well as the way of positioning it within the turbine had to be redesigned. Indeed, the CMC does not withstand shrink-fitted mounting (usually used for metal rings) and its thermal expansion is lower than that a metal material.

Document WO 2015/191 169 already discloses a turbine assembly comprising a plurality of turbine ring sectors made of ceramic composite material, a support structure held by an outer casing, (this structure comprising an annular shroud and annular spacer sectors), and an air deflector which diffuses air.

Document WO 2015/108 658 also discloses a turbine assembly which comprises a ring support structure and a plurality of turbine ring sectors which together form a turbine ring. This assembly also comprises a deflector provided with a passage allowing the introduction of cooling air on the radially inner face of the turbine ring sector.

Finally, document EP 3 118 417 discloses a turbine assembly which comprises a plurality of turbine ring sectors made of CMC ceramic materials and a ring support structure. A deflector can be disposed radially between the support and the ring sector.

However, none of these documents describes or suggests the mounting of the air diffuser by interlocking on one of said spacer sectors, nor the structure of the air diffuser in accordance with the invention.

DISCLOSURE OF THE INVENTION

One aim of the invention is to propose a turbine ring assembly which does not have the aforementioned drawbacks and in particular which is lighter than the turbine ring assemblies known from the state of the art, with, in particular the removal of all the bolted connections, usually present in this kind of integration.

To this end, the invention relates to a turbine assembly extending about a longitudinal axis, this assembly comprising:

a plurality of turbine ring sectors made of ceramic-matrix composite material, assembled circumferentially end to end to form a turbine ring, each turbine ring sector comprising a base with a radially inner face and a radially outer face from which an upstream leg and a downstream leg axially spaced apart from each other radially extend outwardly, a ring support structure, held by an outer annular turbine casing, said ring support structure comprising an annular shroud, and a plurality of angular spacer sectors together forming an annular spacer, said annular spacer being fixed to said annular shroud, and each turbine ring sector being fixed, by said legs, on said annular spacer, at least one air diffuser, configured to diffuse cooling air on said radially outer face of at least one of said turbine ring sectors.

In accordance with the invention, said at least one air diffuser is mounted by interlocking on one of said angular spacer sectors, in an interlocked position, the air diffuser has an inner cavity and a radially inner face pierced with a plurality of air ejection orifices opening out into this cavity, each angular spacer sector has a radially inner face and has on its radially inner face, a rectilinear interlocking slot, which has on part of its length, an interlocking area with a T-shaped cross-section and each air diffuser is provided, in its radially outer portion, with an also T-shaped attachment member, configured to be able to be received and interlocked into said interlocking area, the attachment member of the air diffuser is pierced with an air intake hole opening out into said inner cavity and each angular spacer sector comprises at least one air supply duct, opening out on the one hand onto one of its upstream faces and on the other hand into the bottom of the T-shaped interlocking area of the slot, facing the mouth of the air intake hole of the attachment member of the diffuser, when this diffuser is in its interlocked position, so that this air supply duct is in fluid communication with said air ejection orifices.

Thanks to these characteristics of the invention, and in particular to the interlocking of the air diffuser on one of the angular spacer sectors, the mounting of the diffuser is simplified, it is no longer necessary to use sleeves or pins for its fixing and the overall mass of the turbine ring assembly is reduced.

Furthermore, this mounting allows maintaining the use of a ring made of ceramic-matrix composite material and the associated advantages.

According to other advantageous and non-limiting characteristics of the invention, taken alone or in combination:
said attachment member comprises at least one abutment cooperating with the T-shaped interlocking area of said interlocking slot, so as to block the axial displacement of the air diffuser, once the latter is in the interlocked position;
each angular spacer sector comprises an upstream hook oriented axially downstream and a downstream finger, the annular shroud comprises two annular grooves opening out upstream, and in that these grooves are intended to receive respectively said upstream hook and said downstream finger;
each spacer sector is provided with an upstream flange, and a nozzle of the turbine, forming a crown disposed upstream of said turbine ring assembly presses axially against this upstream flange, in order to hold said upstream hook and said downstream finger respectively in the corresponding grooves of the annular shroud;
said annular shroud comprises a downstream flange, this downstream flange having, in the axial direction of the turbine ring, a thickness generally smaller than the thickness of the downstream leg of the ring sector, the downstream flange exerting a stress on the downstream leg of the ring sector;
said upstream leg of a ring sector is fixed on the upstream flange of the spacer sector using fixing slugs, each spacer sector comprises several downstream lugs and said downstream leg of a ring sector is fixed on at least one downstream lug of this same spacer sector using fixing slugs, the slugs extending mainly axially;
each angular spacer sector has at its two circumferential ends, sealing slots for receiving sealing tabs, these sealing tabs being disposed in said sealing slots between two angular spacer sectors disposed circumferentially end to end.

The invention also relates to a turbomachine comprising a turbine assembly, as mentioned above.

DESCRIPTION OF THE FIGURES

Other characteristics, aims and advantages of the invention will emerge from the following description which is purely illustrative and not limiting, and which should be read in relation to the appended drawings in which.

DETAILED DESCRIPTION OF THE INVENTION

A turbine assembly 1 in accordance with the invention will now be described in relation to FIGS. 1 and 2. This assembly 1 extends about a longitudinal axis X-X'.

Figure 1:
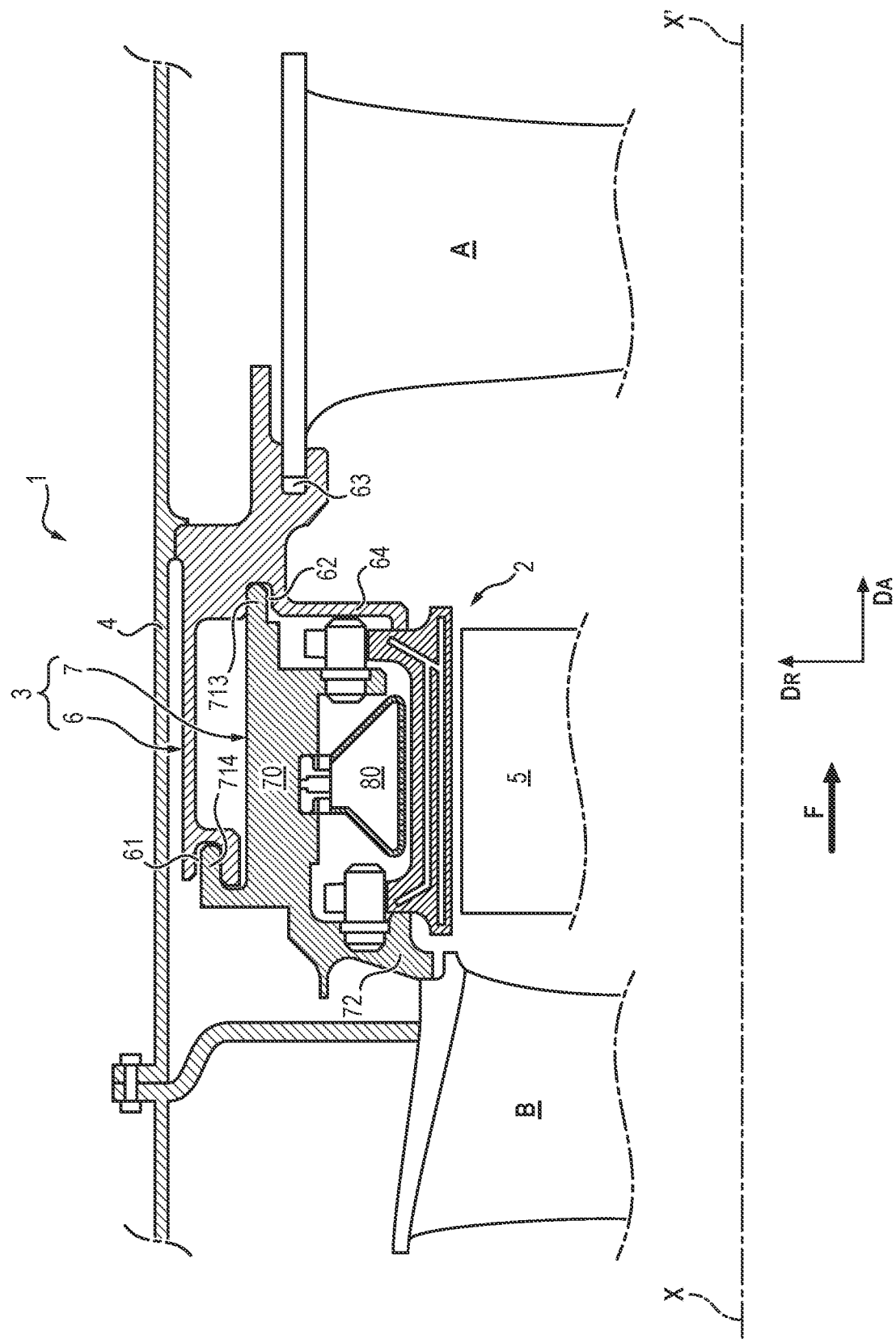
FIG. 1 represents a longitudinal sectional view of a turbine assembly in accordance with the invention, mounted in a turbomachine.

In FIG. 1, the arrow $D_A$ indicates the axial direction of the turbine assembly 1, while the arrow $D_R$ indicates its radial direction. For reasons of simplification of the representation, FIGS. 1 and 2 are partial views of this assembly, which is in reality annular.

This assembly 1 comprises in particular a turbine ring 2 made of ceramic-matrix composite (CMC) material, centered on the longitudinal axis X-X' and a ring support structure 3, held by an outer annular turbine casing 4, the latter being visible only in FIG. 1.

The turbine ring 2 surrounds a turbine blade assembly 5.

In the remainder of the description, the turbine described is a high-pressure turbine. However, the invention also applies to a low-pressure turbine.

The turbine ring 2 is formed of a plurality of angular ring sectors 20, which are placed end to end circumferentially to form a ring.

Each angular ring sector 20 has a section substantially in the shape of an inverted Greek letter Pi (or π), with a base 21, having a radially inner face 211, which defines an angular portion of the inner face of the turbine ring 2 and a radially outer face 212, which defines an angular portion of the outer face of the turbine ring and from which an upstream leg 22 and a downstream leg 23 radially extend outwardly.

Figure 2:
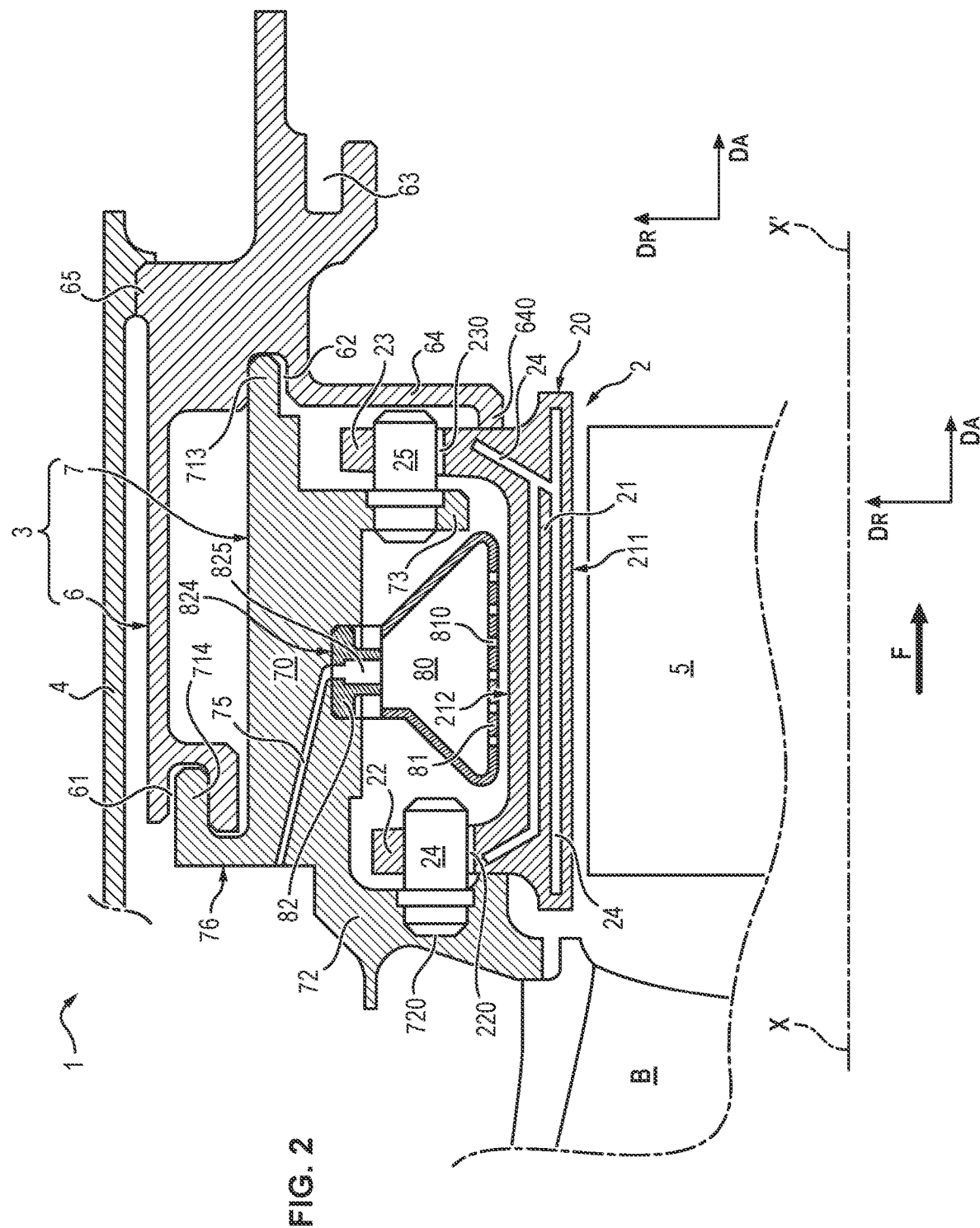
FIG. 2 is an enlarged longitudinal sectional view of a turbine assembly in accordance with the invention.

The terms "upstream" and "downstream" are used here with reference to the direction of flow of the gas stream, inside the turbine ring, represented by the arrow F in FIGS. 1 and 2. The two legs 22 and 23 extend over the entire width of the ring sector, in the direction circumferential. They are axially spaced apart from each other.

The upstream leg 22 is pierced with a plurality of axial orifices 220 and the downstream leg 23 is pierced with a plurality of axial orifices 230.

Conventionally, the sealing between two neighboring angular sectors 20 is ensured by sealing tabs (not visible in the figures), housed in sealing slots 24 arranged at the two ends of each ring sector 20, the slots 24 facing each other when two sectors 20 are assembled end to end.

The ring support structure 3 comprises several distinct parts, assembled to each other, namely an annular shroud 6, and in accordance with the invention, an annular spacer 7.

The annular shroud 6 can be formed by a revolution part, that is to say extending over 360°, or produced by an assembly of a plurality of angular sectors placed end to end.

As best seen in FIG. 2, the annular shroud 6 has an upstream annular groove 61, which opens out upstream, a median annular groove 62, which also opens out upstream and finally a downstream annular groove 63, which opens out downstream. These different annular grooves are centered on the longitudinal axis X-X' and they extend axially.

The downstream annular groove 63 is intended to receive the end of a blade of a nozzle A (here for example a low-pressure nozzle) of the low-pressure turbine, disposed downstream of the high-pressure turbine and visible only in FIG. 1.

In addition, the annular shroud 6 comprises an annular downstream flange 64, which extends radially inwardly and whose end 640 is curved upstream so as to extend axially. The thickness of this flange 64 in its radial portion is sufficiently small so that it maintains an elastic, flexible nature.

Finally, the annular shroud 6 has on its radially outer face, a protrusion 65, intended to come into abutment radially against the outer casing 4. The shroud 6 is fixed on this casing 4 by fixing means not visible in the figures (shrink-fitting). According to another variant of embodiment not represented in the figures, the shroud can be made in one piece with the outer casing 4.

The annular spacer 7 consists of a plurality of angular spacer sectors 70, assembled circumferentially end to end.

Figure 5:
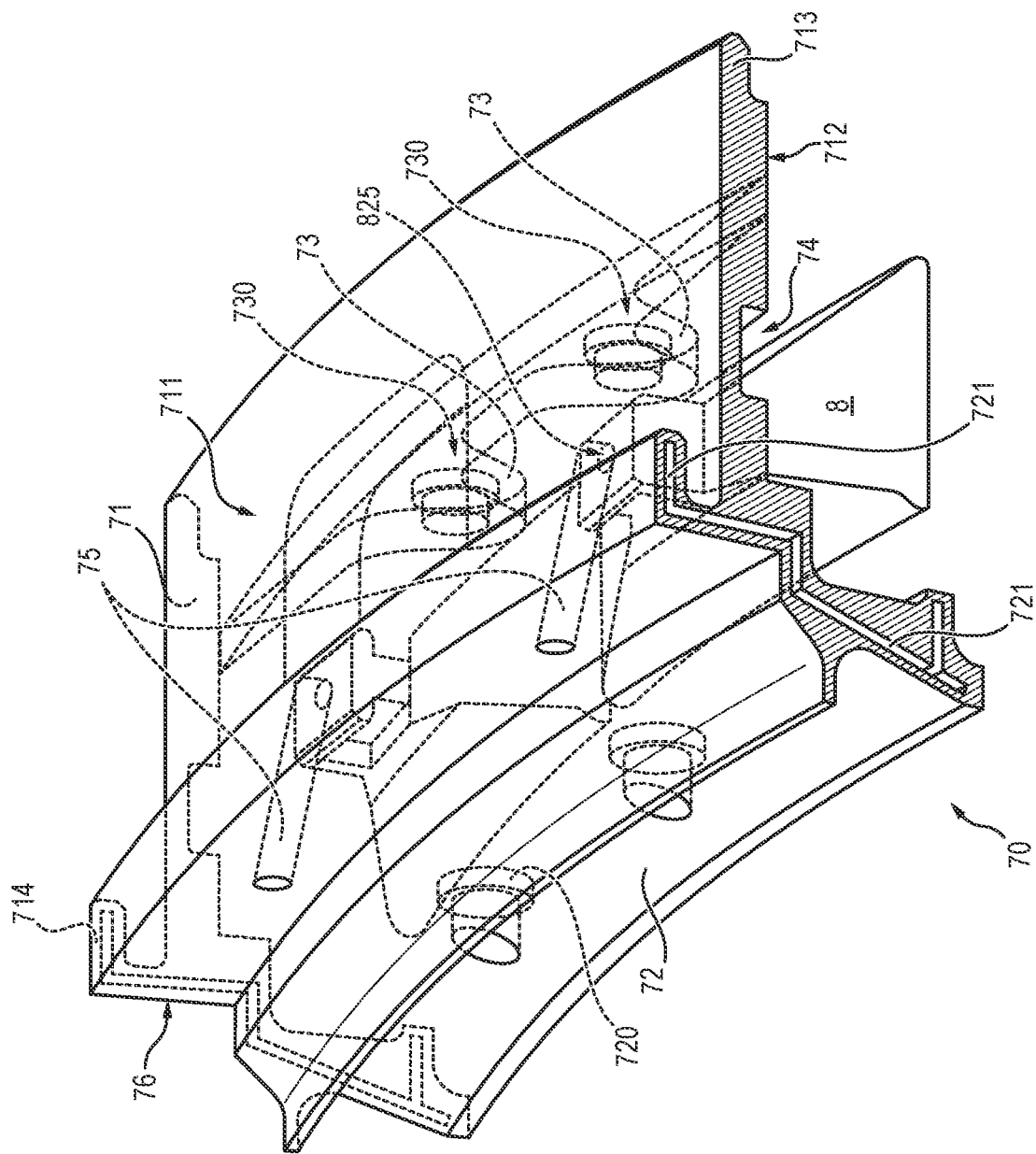
FIG. 5 is a perspective and transparent view of an angular spacer sector, on which two diffusers are mounted.

One of these spacer sectors 70 appears better in FIG. 5. Each sector 70 comprises a curved body 71 which has a radially outer face 711 and a radially inner face 712. The curved downstream edge of this body 71 defines an axially oriented downstream finger 713. This downstream finger 713 is intended to be inserted into the median annular groove 62 of the shroud 6. As can be seen better in FIG. 2, the assembly of the spacer 7 and of the shroud 6 is made so that the radially outer face of the downstream finger 713 is pressed against the radially inner face of the median annular groove 62, and this, so as to ensure the sealing between the two parts.

An upstream hook 714 in the form of a ring sector, oriented axially downstream protrudes outwardly from the upstream end of the radially outer face 711. This upstream hook 714 is intended to be inserted into the upstream annular groove 61 of the annular shroud 6. As can be seen in FIG. 2, the assembly of the spacer 7 and of the shroud 6 is made so that the radially outer face of the upstream annular groove 61 is pressed against the radially inner face of the upstream hook 714, and this, so as to ensure the sealing between the two parts.

In FIG. 2, it can also be seen that the contact of the downstream finger 713 upwardly and of the upstream hook downwardly guarantees the radial positioning of each spacer sector 70 with respect to the annular shroud 6 (tilting effect).

In addition, the body 71 comprises an upstream flange 72 and a plurality of downstream lugs 73. In FIG. 5, it can be seen that these lugs 73 are for example two per sector 70. Each lug 73 is pierced with an axial orifice 730. Furthermore, the flange 72 has several blind, axial cavities 720 opening out downstream.

The upstream flange 72 and the downstream lugs 73 extend radially or substantially radially in the direction of the interior of the ring assembly 1, that is to say in the direction of the axis X-X'.

The turbine ring assembly 1 further comprises upstream axial slugs 24 and downstream axial slugs 25. The upstream axial slugs 24 are inserted into the blind cavities 720 and through orifices 220, so as to ensure the fixing of the upstream leg 22 of the ring sector 20 on the upstream flange 72. The downstream axial slugs 25 are inserted through the axial orifices 730 of the spacer 7 and 230 of the ring sector 20, so as to ensure the fixing of the downstream leg 23 of the ring sector 20 on the lugs 73. The different axial slugs are evenly distributed about the longitudinal axis X-X' of the ring.

When the assembly is done, the lugs 73 are disposed upstream of the downstream leg 23 of the ring 2 and the upstream flange 72 is upstream of the upstream leg 22.

In addition, the upstream 22 and downstream 23 legs of each ring sector 20 are held respectively between the upstream flange 72 and the flange 64, which each exert an axial stress on these legs, the end 640 of the flange 64 pressing against the downstream face of the downstream leg 23, these axial stresses being opposed.

The upstream flange 72 is generally thicker in the axial direction (with the exception of the areas provided with the casings 720) than the radial portion of the flange 64. The upstream flange 72 is therefore more rigid and the flange 64 is more flexible and deformable.

Finally, as can be seen in FIG. 1, the turbine ring assembly 1 is disposed between two nozzle stages, here between the nozzle A for example low-pressure nozzle and the nozzle B, for example here high-pressure nozzle of the high-pressure turbine. This nozzle B, disposed upstream of the turbine ring assembly 1 presses axially against the upstream flange 72. Thus, in operation, the take-up of the forces of the nozzle B is ensured by the spacer 7 by limiting the transmission of these forces to the CMC ring 2, due to the high stiffness of the upstream flange 72. The transmission of the forces to the ring 2 is also limited by the flexible nature of the downstream flange 64.

Finally, once the assembly has been done, the annular shroud 6 surrounds the annular spacer 7, which itself surrounds the ring 2, so that these three elements are concentric and coaxial, with a longitudinal axis X-X'.

Advantageously, and as best seen in FIG. 5, each angular spacer sector 70 has at its both ends, sealing slots 721 for receiving sealing tabs. These tabs, not represented in the figures, are disposed between two angular spacer sectors 70, disposed circumferentially end to end. This allows ensuring the sealing between two neighboring sectors 70.

Preferably, these sealing slots 721 are arranged at the two ends of the upstream flange 72, as well as at the two ends of the hook 714.

The turbine assembly 1 also comprises an air diffuser 8, intended to diffuse cooling air on the radially outer face 212 of the base 21. This air diffuser 8 comprises walls which delimit an interior cavity 80 (see FIG. 2). In the exemplary embodiment represented in the figures, the walls of this air diffuser have the shape of a truncated pyramid.

This air diffuser 8 has a preferably planar radially inner wall 81 pierced with a plurality of air ejection orifices 810.

According to the invention, each air diffuser 8 is mounted by interlocking on one of the angular spacer sectors 70. In the example represented in FIG. 5, two air diffusers 8 are mounted on an angular spacer sector 70. They are in a position called "interlocked" position.

Figure 6:
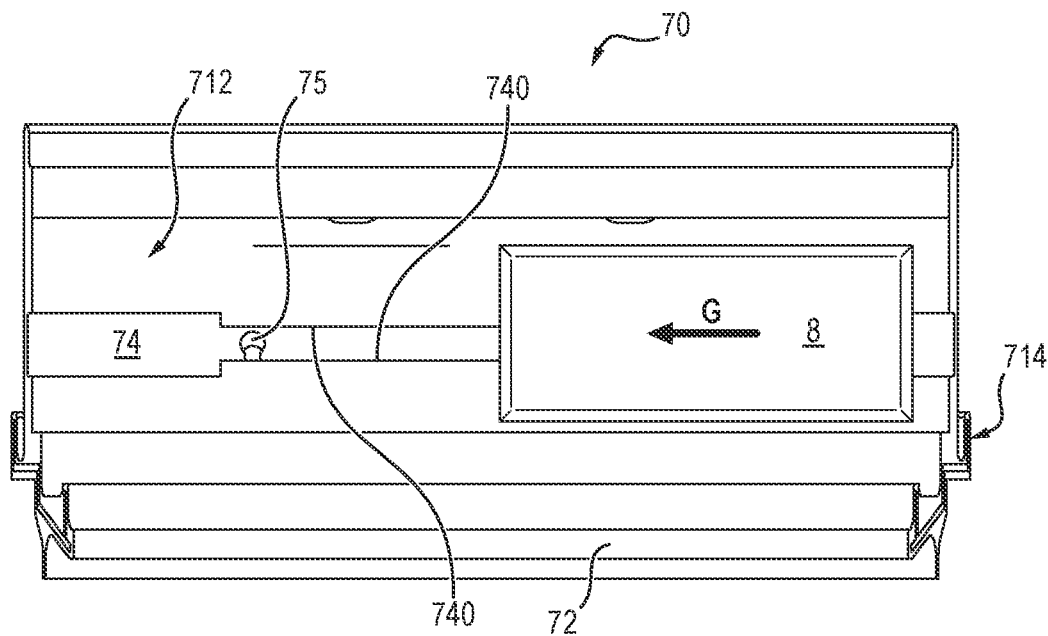
FIG. 6 is a bottom view of an angular spacer sector on which a diffuser is mounted.
Figure 7:
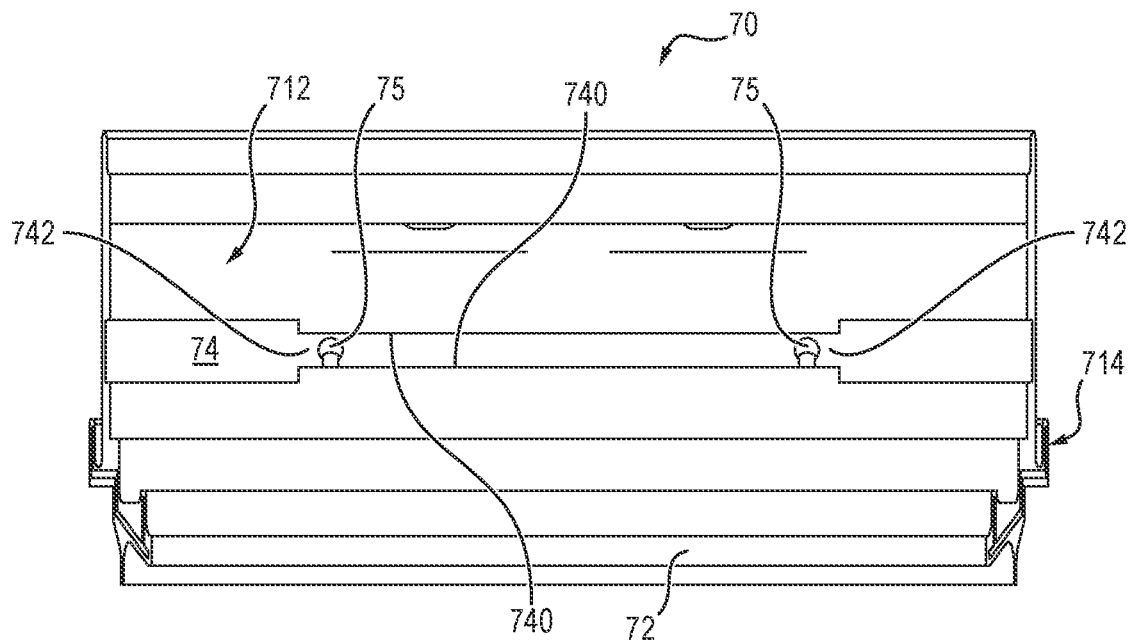
FIG. 7 is a view similar to FIG. 6 but without the diffuser.

To this end, each angular spacer sector 70 has on one of its radially inner faces, here its face 712, a rectilinear interlocking slot 74 (see FIGS. 5 to 7). This slot is rectilinear, that is to say not curved, whereas it is arranged in the body 71 which is curved.

Advantageously, the spacer sectors 70 are manufactured by additive manufacturing.

Figure 3:
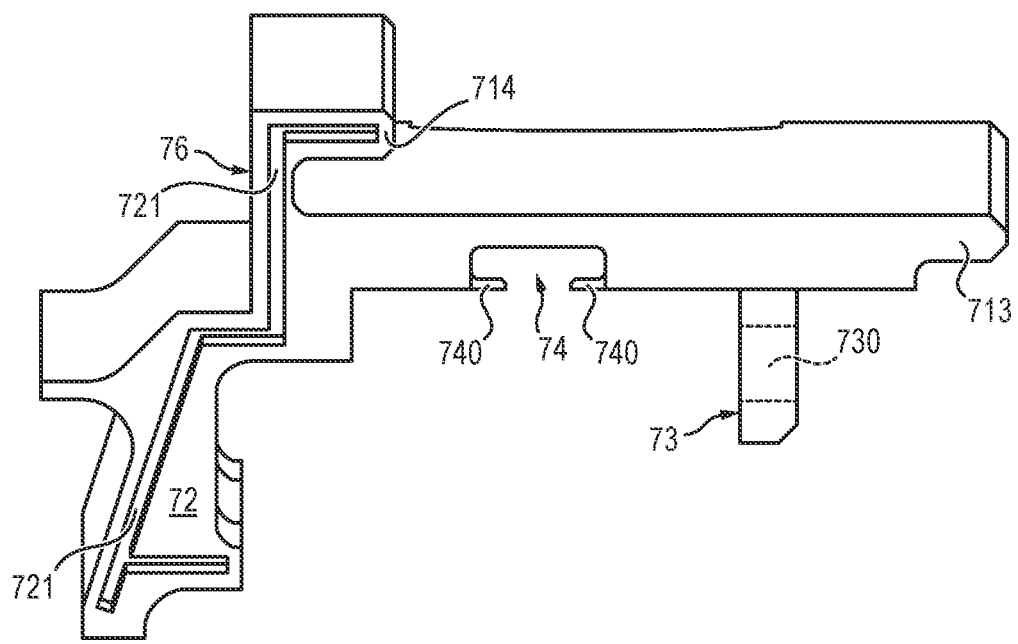
FIG. 3 is an elevational view of one end of an angular spacer sector.

In addition, this slot 74 has on part of its length, preferably its central portion, a T-shaped cross-section, forming an interlocking area 742. This T-shaped cross-section appears better on the section of FIG. 3. At this location, the slot 74 is punctually provided with two tabs 740 facing each other and spaced apart from each other, so as to delimit the two branches of the T.

Figure 4:
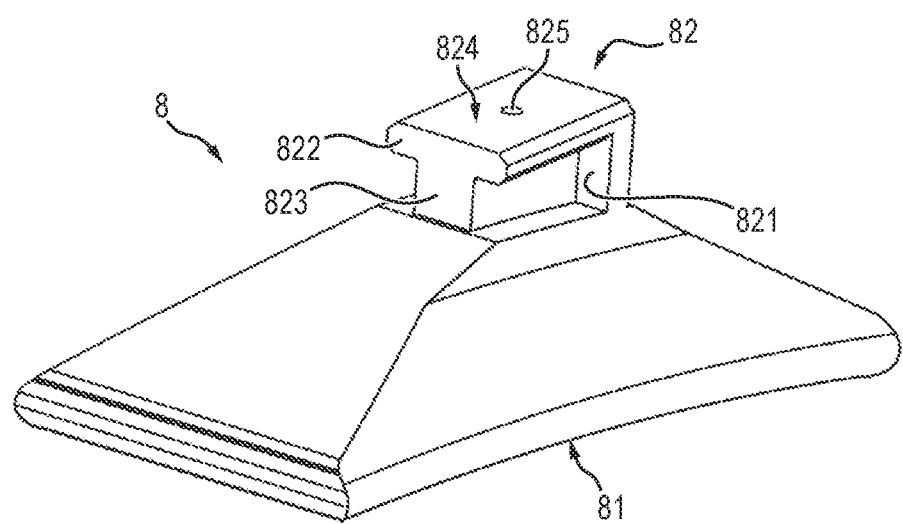
FIG. 4 is a perspective view of an air diffuser in accordance with the invention.

Furthermore, as best seen in FIG. 4, the air diffuser 8 has at its radially outer portion, here at the top of the truncated pyramid, an also T-shaped attachment member 82 configured to be able to be received and interlocked by sliding in the slot 74. As the latter is rectilinear, the sliding is facilitated.

Advantageously, this attachment member 82 has at one of its ends, two abutments 821, disposed on either side of the T. The horizontal branch 822 of the T-shaped attachment member is configured to be received in the slot 74 between the bottom of the latter and the two tabs 740, while the vertical branch 823 of the T is received between the two tabs 740. The radially outer face 824 of the member 82 is planar.

Complementary interlocking shapes of the attachment member 82 and of the slot 74, other than a T-shape, could also be envisaged.

The air diffuser 8 can thus be inserted by axial sliding into the slot 74, from one of the ends of the sector 70 (insertion arrow G in FIG. 6), the tabs 740 retaining the horizontal branch 822 of the T, until the two abutments 821 come into contact with the two respective tabs 740. These abutments 821 thus block the axial sliding of the air diffuser 8 inside the slot 740. The diffuser 8 cannot move further towards the center of the spacer sector 70. Additional wedges, not represented in the figures, can be added to prevent the displacement of the diffuser 8 in the direction opposite to that of its insertion.

In addition, the attachment member 82 is pierced with at least one air intake hole 825 which opens out both onto the outer face 824 of the attachment member 82 and inside the cavity 80.

Each angular spacer sector 70 further comprises at least one air supply duct 75 (in the embodiment represented in FIG. 5, two ducts 75). Each duct 75 opens out on the one hand onto the upstream face 76 of the angular sector 70 and on the other hand into the bottom of the slot 74, facing the slot portion 74 having a T-shaped section (interlocking area 742). As can be seen in FIG. 5, the duct 75 is configured so that when the air diffuser 8 is positioned in abutment inside the slot 74, against the tabs 740, (interlocked position), this duct 75 opens out at the mouth of the air intake hole 825 of the attachment member 82 of the diffuser 8.

Thus, the cooling air, taken from a stage of the compressor of the turbomachine, enters the duct 75 then the diffuser 8 where it is ejected via the air ejection orifices 810, in the direction of the inner face 212 of the ring sector base 21, thus leading to the cooling of the latter.

Advantageously, the shroud 6, the spacer 7 and the diffuser 8 are made of metal.

The invention claimed is:

1. A turbine assembly extending about a longitudinal axis, this assembly comprising:
   a plurality of turbine ring sectors made of ceramic-matrix composite material, assembled circumferentially end to end to form a turbine ring, each turbine ring sector comprising a base with a radially inner face and a radially outer face from which an upstream leg and a downstream leg axially spaced apart from each other radially extend outwardly,
   a ring support structure, held by an outer annular turbine casing, said ring support structure comprising an annular shroud, and a plurality of angular spacer sectors together forming an annular spacer, said annular spacer being fixed to said annular shroud, and each turbine ring sector being fixed, by said legs, on said annular spacer,
   at least one air diffuser, configured to diffuse cooling air on said radially outer face of at least one of said turbine ring sectors,
   wherein said at least one air diffuser is mounted by interlocking on one of said angular spacer sectors, in an interlocked position,
   wherein the air diffuser has an inner cavity and a radially inner face pierced with a plurality of air ejection orifices opening out into this inner cavity,
   wherein each angular spacer sector has a radially inner face and has on the radially inner face of the angular spacer sector, a rectilinear interlocking slot, which has on part of a length of the rectilinear interlocking slot, an interlocking area with a T-shaped cross-section,
   wherein each air diffuser is provided, in a radially outer portion of the air diffuser, with a T-shaped attachment member, configured to be able to be received and interlocked into said interlocking area,
   wherein the attachment member of the air diffuser is pierced with an air intake hole opening out into said inner cavity,
   and wherein each angular spacer sector comprises at least one air supply duct, opening out onto one of an upstream faces of the angular spacer sector and into a bottom of the T-shaped interlocking area of the interlocking slot, facing a mouth of the air intake hole of the attachment member of the air diffuser, when this air diffuser is in the interlocked position, so that this air supply duct is in fluid communication with said air ejection orifices.

2. The turbine assembly according to claim 1, wherein said attachment member comprises at least one abutment cooperating with the T-shaped interlocking area of said interlocking slot, so as to block an axial displacement of the air diffuser, once the air diffuser is in the interlocked position.

3. The turbine assembly according to claim 1, wherein each angular spacer sector comprises an upstream hook oriented axially downstream and a downstream finger, wherein the annular shroud comprises two annular grooves opening out upstream, and wherein these annular grooves are intended to receive respectively the upstream hook and the downstream finger.

4. The turbine assembly according to claim 3, wherein each spacer sector is provided with an upstream flange and wherein a nozzle of the turbine, forming a crown disposed upstream of said turbine ring assembly presses axially against this upstream flange, in order to hold said upstream hook and said downstream finger respectively in the corresponding annular grooves of the annular shroud.

5. The turbine assembly according to claim 4, wherein said annular shroud comprises a downstream flange the downstream flange having, in the axial direction of the turbine ring, a thickness generally smaller than a thickness of the downstream leg of the ring sector, the downstream flange exerting a stress on the downstream leg of the ring sector.

6. The turbine assembly according to claim 4, wherein said upstream leg of a ring sector is fixed on the upstream flange of the spacer sector using fixing slugs, wherein each spacer sector comprises several downstream legs and wherein said downstream leg of a ring sector is fixed on at least one downstream lug of this same spacer sector using fixing slugs, the fixing slugs extending mainly axially.

7. The turbine assembly according to claim 1, wherein each angular spacer sector has two circumferential ends and has at the two circumferential ends of each angular spacer sector, sealing slots for receiving sealing tabs, these sealing tabs being disposed in said sealing slots between two angular spacer sectors disposed circumferentially end to end.

8. A turbomachine comprising a turbine assembly according to claim 1.

\* \* \* \* \*